No. 754,994. PATENTED MAR. 22, 1904.
W. B. GRAY.
MACHINE FOR TREATING FIBROUS PLANTS.
APPLICATION FILED FEB. 3, 1903.
NO MODEL. 2 SHEETS—SHEET 1.
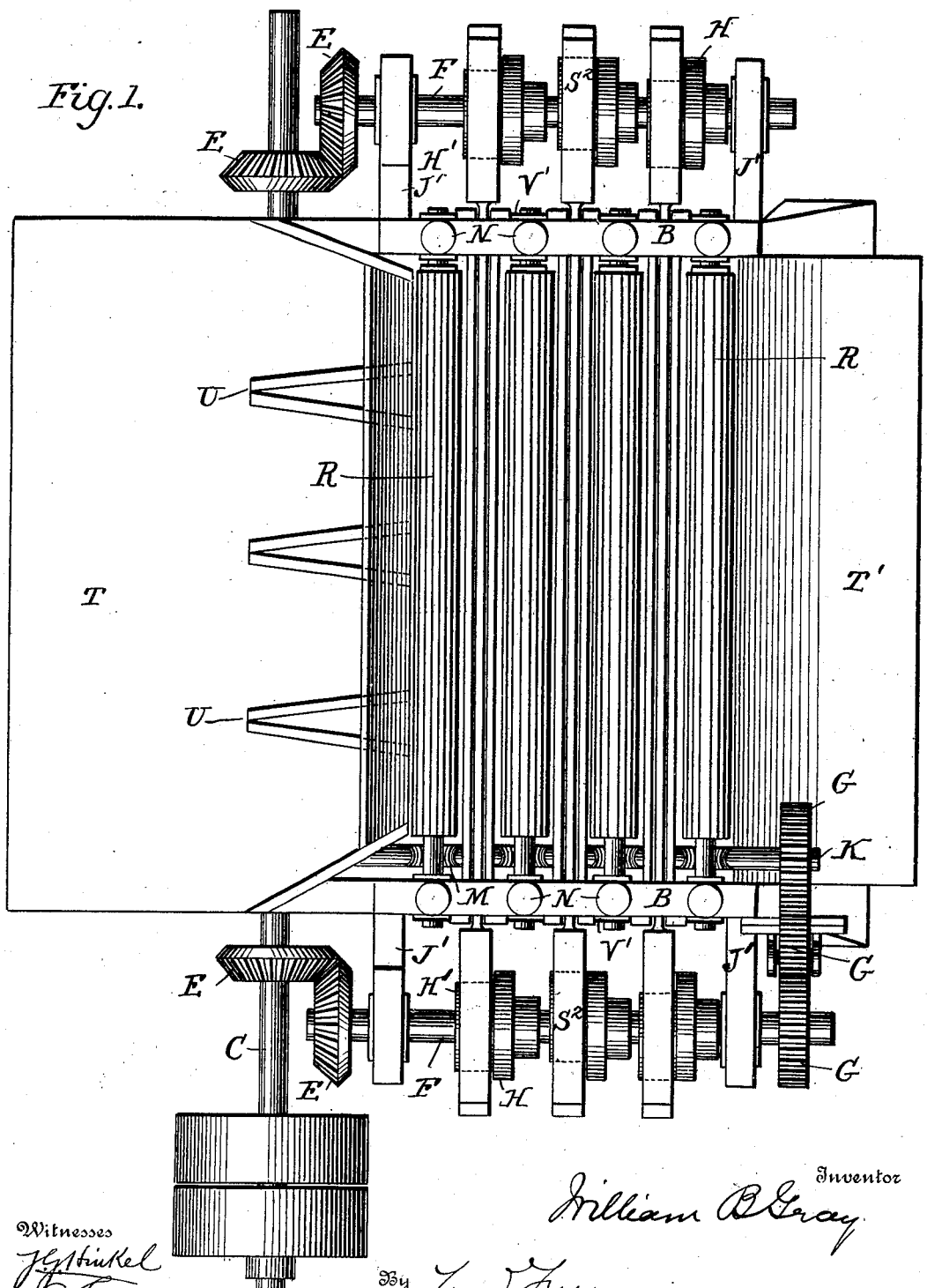

No. 754,994. PATENTED MAR. 22, 1904.
W. B. GRAY.
MACHINE FOR TREATING FIBROUS PLANTS.
APPLICATION FILED FEB. 3, 1903.
NO MODEL. 2 SHEETS—SHEET 2.
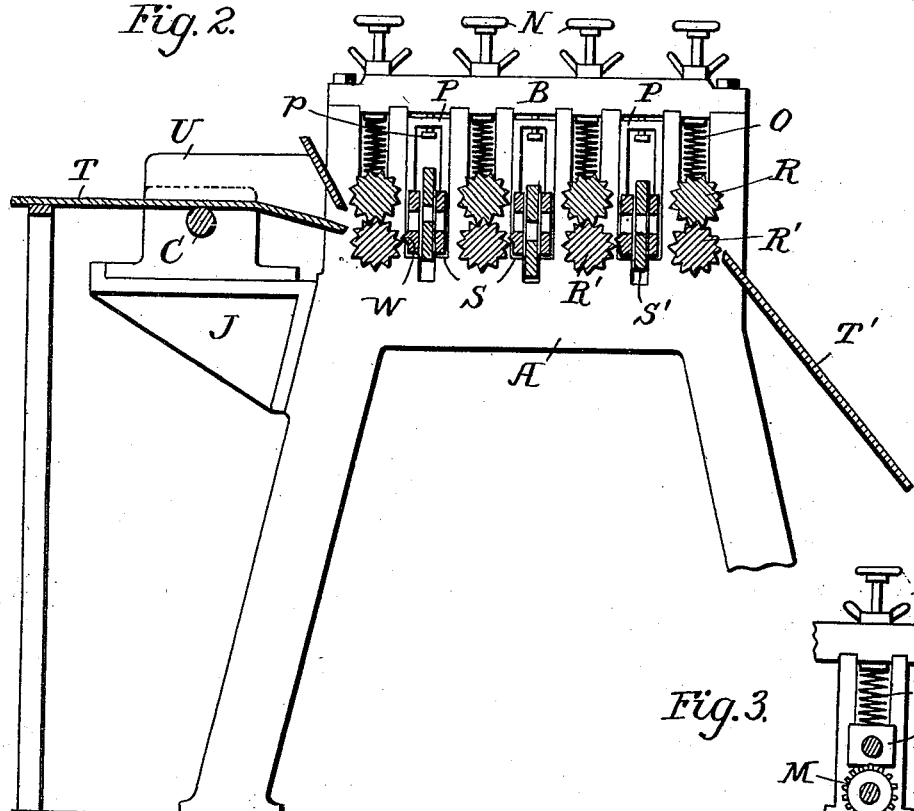
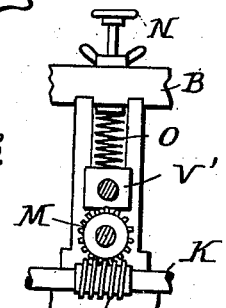
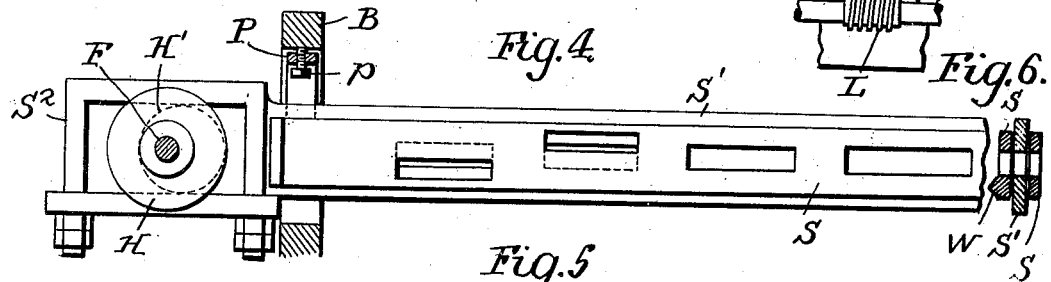
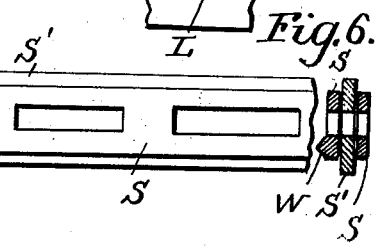
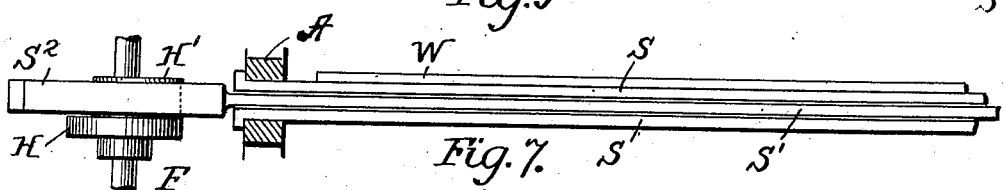
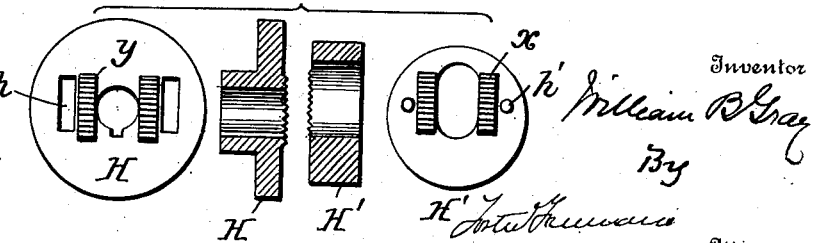

No. 754,994. Patented March 22, 1904.

UNITED STATES PATENT OFFICE.

WILLIAM BENJAMIN GRAY, OF GLENANNE, IRELAND.

MACHINE FOR TREATING FIBROUS PLANTS.

SPECIFICATION forming part of Letters Patent No. 754,994, dated March 22, 1904.

Application filed February 3, 1903. Serial No. 141,764. (No model.)

*To all whom it may concern:*

Be it known that I, WILLIAM BENJAMIN GRAY, linen manufacturer, a subject of the King of Great Britain and Ireland, and a resident of Glenanne, in the county of Armagh, Ireland, have invented certain new and useful Improvements in Machines for Treating Fibrous Plants, (for which I have applied for Letters Patent of Great Britain and Ireland, dated July 4, 1902, and numbered 14,909;) and I do hereby declare the following to be a full, clear, and exact description of my invention, such as will enable others skilled in the art to which it appertains to make and use the same, reference being had to the accompanying drawings, and to the letters of reference marked thereon, which form a part of this specification.

My invention relates to the process of breaking or scutching flax or other fibrous plants preparatory to their being manufactured into yarns; and it consists in the use of a machine wherein such plants are passed through or between horizontal fluted or other rollers into the openings in a set of slotted blades or plates by which the woody portions of the plants under treatment are broken and separated from the fibrous portions thereof. I prefer to construct each set of three such blades or plates, two or which remain stationary, while the third is made to rapidly rise and fall between the two stationary ones by means of an adjustable eccentric at each end mounted upon a cross-shaft and coupled to a boss upon the same shaft, which is actuated by or from the driving-shaft. Each blade or plate in the set is arranged with two or more longitudinal and rectangular square-edged slots in line. The slots may be of different dimensions, but must be opposite to and correspond with the relative slots in each of the other blades or plates of the same set to allow the plants being treated to pass right through them. The dimensions of these slots and the throw of the reciprocating blade or plate may be varied according to the weight and character of the plant to be treated, and the slots in successive blades or plates through which the plants pass may gradually decrease in area to accommodate the plants as the woody portion is broken and cast off and the material becomes lighter and needs less room, and so carry it forward in narrow or compact bunches and prevent it radiating or spreading, so as to partially escape treatment. I may in some instances make the slots wider in the center than at the ends and may bevel their edges next the adjacent slots as better adapted to plants like rhea and jute, and I provide ledges underneath the slots of the front blade or plate to help pass the plants into them. The stationary blades or plates are rested on the frame of the machine. The rollers between which the plants are passed are driven from one end by worm-wheels in gear with worms on a shaft underneath, to which shaft motion is transmitted through spur-wheels from the adjacent shaft carrying the eccentric, and adjusting-screws and spiral springs are employed for pressure of the top roller against the plants carried between it and the bottom one.

In the treatment of flax and other plants by this machine steeping and retting are preferably dispensed with as a preparatory operation, and the saving of the seed is rendered practicable.

In the accompanying drawings, Figure 1 is plan of the machine which I have constructed for the purpose of carrying my invention into effect and on which three sets of slotted blades or plates, with four sets of horizontal fluted rollers for passing the plants through the openings in the blades or plates and the relative gearing for actuating the rollers and the vertically-reciprocating blades or plates, are among other parts shown. Fig. 2 is a vertical longitudinal section. Fig. 3 is a detail, partly in section, showing the means for driving and adjusting the fluted rollers. Fig. 4 is an enlarged front elevation of portions of the slotted blades or plates. Fig. 5 is a plan of Fig. 4, partly in section. Fig. 6 is a transverse section of the slotted blades. Fig. 7 is a group showing the boss and eccentric in plan and section separated from each other.

The frame of the machine A is of cast-iron and of ordinary pattern, with covers B B on top of the sides. The main driving-shaft C is of wrought-steel supported on pedestals J J and carries two pulleys, of which one is fast and the other loose, as customary. The driving-shaft C transmits motion through the bevel-wheels E E and E E to the shafts F F at the sides of the machine and carrying the bosses H H, keyed upon them, and which carry the eccentrics H' H', bolted to the bosses when adjusted. The bosses H H are provided with elongated slots $h$, and the eccentrics are provided with holes $h'$ for the passage of the securing-bolts, and the eccentrics may thus be adjustably secured to the bosses and the throw of the eccentrics be varied as desired. Preferably the bosses and eccentrics will be provided with roughened surfaces, (indicated by $y$ and $x$, respectively.) One of the side shafts F transmits motion through the spur-wheels G G G to the shaft K, carrying the worms L L, to drive the worm-wheels M M, keyed on the spindles of the bottom rollers R' R'. The side shafts F F are supported by the pedestals J' J'.

P P are two-legged end pieces of wrought-iron placed under B B, the covers of the frame, for holding the stationary blades or plates S S in position. The lower edges of the blades S S rest upon shoulders on the sides of the frame, and set-screws $p$, working in the upper ends of the pieces P, are adapted to bear against the under side of the covers B B and when turned in the proper direction to cause said pieces to exert a clamping action on the blades S S to hold them in position.

S' is a reciprocating blade or plate intervening between two stationary blades or plates and having an oblong rectangular cage $S^2$ at each end containing the eccentrics from which it receives its throw.

It is desirable that the degree of pressure exerted by the rollers R and R' may be varied as desired, and for this purpose the rollers R are mounted in vertically-sliding bearings V', and springs O are interposed between the bearings and adjusting-screws N, so that by operating the screws N the tension of said springs may be varied. In order to properly guide the plants from the rollers R and R' into the slots in the blades S and S', the front blade S of each set is provided with a forwardly-projecting ledge W at the base of its slots.

T is a feeding-table which I furnish with wood battens U U to guide the streaks or bunches of plants in their passage to the portions of the rollers which are opposite to the slots, and T' is a delivery-table which receives the fibers after the removal of the woody portions of the plants by the action of the rollers and blades or plates.

It will be observed that the longitudinally-fluted rollers R mesh with the similar rollers R' and that the latter are positively driven by the worms L, and as the springs O will always tend to hold said rollers in mesh with each other the rollers R will also be positively driven.

It will be understood that the plants to be treated are spread in streaks or bunches between the wood battens upon the feeding-table, so as to be caught by the first pair of rollers opposite to and thereby carried forward and passed through the slots in the blades or plates, when the second pair of rollers pass them to another set of blades or plates, and so on to each successive set, if any, ultimately placing them when divested of the woody portion upon the delivery-table.

Without limiting myself to the precise details of construction and arrangement of the parts of my invention as described and shown, I claim—

1. In a machine for scutching fibrous plants, the combination of a supporting-frame, a pair of slotted, stationary blades supported on said frame with a space between them, a movable slotted blade in the space between the stationary blades and provided with a cage at each end, eccentrics supported within the cages, means for rotating the eccentrics, and a pair of rotatable fluted rollers on each side of the blades, substantially as set forth.

2. In a machine for scutching fibrous plants, the combination of a supporting-frame, a pair of slotted, stationary blades supported on said frame with a space between them, a movable slotted blade in the space between the stationary blades and provided with a cage at each end, rotatable shafts extending through said cages and each carrying a boss, eccentrics within the cages adjustably secured to the bosses, and a pair of rotatable, fluted rollers on each side of the blades, substantially as set forth.

3. In a machine for scutching fibrous plants, the combination of a supporting-frame, a pair of slotted, stationary blades supported on said frame with a space between them, a movable slotted blade in the space between the stationary blades and provided with a cage at each end, eccentrics supported within the cages, means for rotating the eccentrics, a pair of rotatable fluted rollers on each side of the blades, and means for varying the pressure between the rollers of each pair, substantially as set forth.

4. In a machine for scutching fibrous plants, the combination of a supporting-frame, a pair of slotted, stationary blades supported on said frame with a space between them, a movable slotted blade in the space between the stationary blades and provided with a cage at each end, eccentrics supported within the cages, means for rotating the eccentrics, a pair of rotatable fluted rollers meshing with each other, on each side of the blades, means for positively driving one of the rollers of each pair, and means for varying the pressure between the rollers of each pair, substantially as set forth.

In testimony whereof I have signed my name to this specification in the presence of two subscribing witnesses.

WILLIAM BENJAMIN GRAY.

Witnesses:
    HUGH HYNDMAN,
    HUGH RODDY.